United States Patent
Lee et al.

(10) Patent No.: US 7,933,523 B2
(45) Date of Patent: Apr. 26, 2011

(54) CLOCK EXTRACTING APPARATUS

(75) Inventors: Jaemyoung Lee, Seoul (KR); Je-Soo Ko, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 459 days.

(21) Appl. No.: 11/449,229

(22) Filed: Jun. 7, 2006

(65) Prior Publication Data

US 2006/0280506 A1    Dec. 14, 2006

(30) Foreign Application Priority Data

Jun. 8, 2005    (KR) .................. 10-2005-0048904

(51) Int. Cl.
*H04B 10/00* (2006.01)
*H04B 10/06* (2006.01)

(52) U.S. Cl. .................. 398/155; 398/212; 398/214

(58) Field of Classification Search .................. 398/155, 398/212, 214
See application file for complete search history.

(56) References Cited

U.S. PATENT DOCUMENTS

| 5,442,326 A | * | 8/1995 | Liberman | 331/94.1 |
| 2004/0067063 A1 | * | 4/2004 | Lee et al. | 398/155 |

FOREIGN PATENT DOCUMENTS

| JP | 08-240826 | 9/1996 |
| KR | 1020030047966 A | 6/2003 |

OTHER PUBLICATIONS

Masahiko Jinno et al., "Optical Tank Circuits Used for All-Optical Timing Recovery", Apr. 1992, IEEE Journal of Quantum Electronics, vol. 28, No. 4, pp. 895-900.*
Jeong, Yong Deok, et al., "All-Optical NRZ-to-PRZ Converter at 10 Gb/s Based on Self-Phase Modulation of Fabry-Perot Laser Diode", Apr. 2004, IEEE Photonics Technology Letters, vol. 16, No. 4, pp. 1179-1181.*
C. Kim et al., "All-optical clock recovery of NRZ data at 40 Gbit/s using Fabry-Perot filter and two-section gain-coupled DFB laser", Electronics Letters, Oct. 2, 2003, vol. 39, No. 20.*
Yingmin Yang et al., "Optical Clock Recovery at Line Rates via Injection Locking of a Long Cavity Fabry-Perot Laser Diode", IEEE Photonics Technology Letters, Jun. 2004, vol. 16, No. 6, pp. 1561-1563.*
Optical signal processing for very high speed (>40 Gbit/s) ETDM binary NRZ clock recovery, Optical Fiber Commuunication conference, vol. OFC2001, pp. MG1-1-MG1-3, 2001).

* cited by examiner

*Primary Examiner* — Ken N Vanderpuye
*Assistant Examiner* — Daniel G Dobson
(74) *Attorney, Agent, or Firm* — Blakely, Sokoloff, Taylor & Zafman LLP

(57) ABSTRACT

A clock extracting apparatus is provided. In the clock apparatus, two frequency components are made to have an equal magnitude by adjusting a temperature and current applied to an FP LD, and a clock signal is extracted by beating the two frequency components having the equal magnitude. The clock extracting apparatus includes: a circulator for changing a direction of an inputted optical signal; an adjuster for adjusting a characteristic and wavelength of a spectrum; and a clock extractor for selecting two frequency components having different magnitudes on the spectrum of the inputted optical signal, receiving an adjusted signals in which magnitudes of the two frequency components are made equal by the adjuster, making the two frequency components have an equal magnitude, and extracting a clock signal by beating the two frequency components having the equal magnitude.

5 Claims, 5 Drawing Sheets

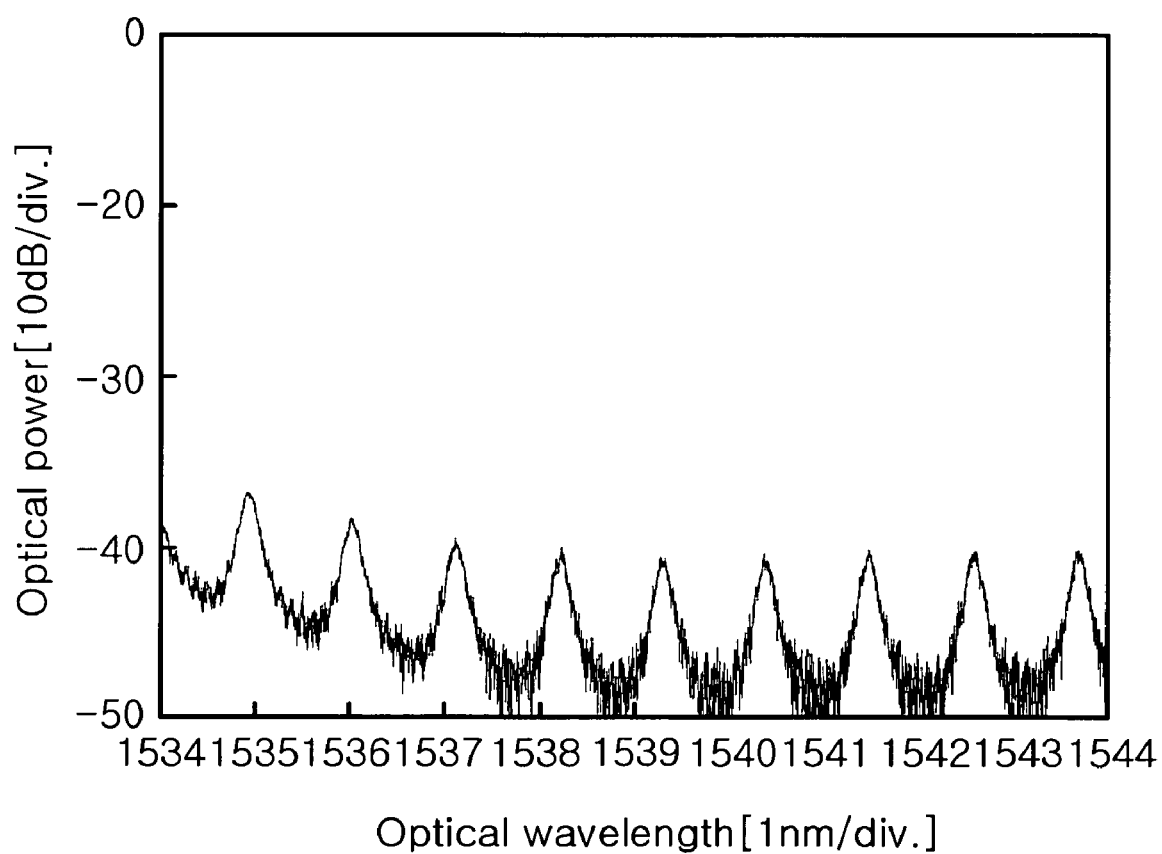

CLOCK EXTRACTING APPARATUS

FIELD OF THE INVENTION

The present invention relates to a clock extracting apparatus; and, more particularly, to a clock extracting apparatus for extracting a clock signal by beating two frequency signals that are made to have equal magnitude through a Fabry-Perot (FP) laser diode (LD).

DESCRIPTION OF THE RELATED ART

In the optical communication, with the technical development of a transmitter that converts a desired data into optical signal, the increase of the transmission speed has demanded the improvement in signal processing rate of a receiver that recovers an original signal from a received signal. In order to satisfy this demand, the extraction of the optical clock signal has been studied.

The clock can be optically extracted by a self-pulsating method using a laser diode, a method using an optical loop mirror, and so on. However, the fabrication of devices for extracting a desired clock is still difficult. Also, the instability of an optical system has to be solved. One approach to overcoming these problems is to recover a clock signal using optical frequency components. After beating two adjacent frequency components corresponding to a data transmission rate of the received signal, the clock component of the received signal is obtained by producing a frequency component corresponding to the frequency difference of two spectral components.

According to the prior art, two frequency components on the optical spectrum are selected and made to have an equal magnitude. Then, the clock signal is obtained by beating the two frequency components. At this point, the two frequency components are made to have an equal magnitude by adjusting a tunable bandpass filter, as illustrated in FIG. 1. FIG. 1C represents an optical spectrum of a signal passing through the bandpass filter.

Generally, optical spectra for different input current in an FP LD are shown in FIG. 2A to 2C. Different optical powers of the optical spectra result from difference in an amount of current applied to the FP LD.

FIGS. 2A, 2B and 2C are graphs of optical spectra when an input current in a conventional FP LD is 10 mA, 20 mA and 50 mA, respectively.

As illustrated in FIGS. 2A to 2C, as an amount of an applied current increases, the difference between a maximum value and a minimum value in the optical spectrum increases. A general NRZ signal exhibits a spectrum shown in FIG. 1A, and the clock component extraction can be achieved by extracting two adjacent peaks among three peaks in FIG. 1A. In this case, however, there is a problem in that the magnitudes of the selected clock components are not equal to each other.

SUMMARY OF THE INVENTION

It is, therefore, an object of the present invention to provide a clock extracting apparatus, in which two frequency components are made to have an equal magnitude by adjusting a temperature and current applied to an FP LD, and a clock signal is extracted by beating the two frequency components having the equal magnitude.

In accordance with an aspect of the present invention, there is provided a clock extracting apparatus including: a circulator for changing a direction of an inputted optical signal; an adjuster for adjusting a bandwidth and wavelength on a spectrum; and a clock extractor for selecting two frequency components having different magnitudes on the spectrum of the inputted optical signal, receiving an adjusted signal in which difference in magnitudes of the two frequency components are adjusted from the adjuster, making the two frequency components have an equal magnitude, and extracting a clock signal by beating the two frequency components having the equal magnitude.

BRIEF DESCRIPTION OF THE DRAWINGS

The above and other objects and features of the present invention will become apparent from the following description of the preferred embodiments given in conjunction with the accompanying drawings, in which:

FIGS. 2A to 2C are graphs of optical spectra according to an input current of a conventional FP LD.

DETAILED DESCRIPTION OF THE INVENTION

A clock extracting apparatus in accordance with exemplary embodiments of the present invention will be described in detail with reference to the accompanying drawings.

Figure 3:
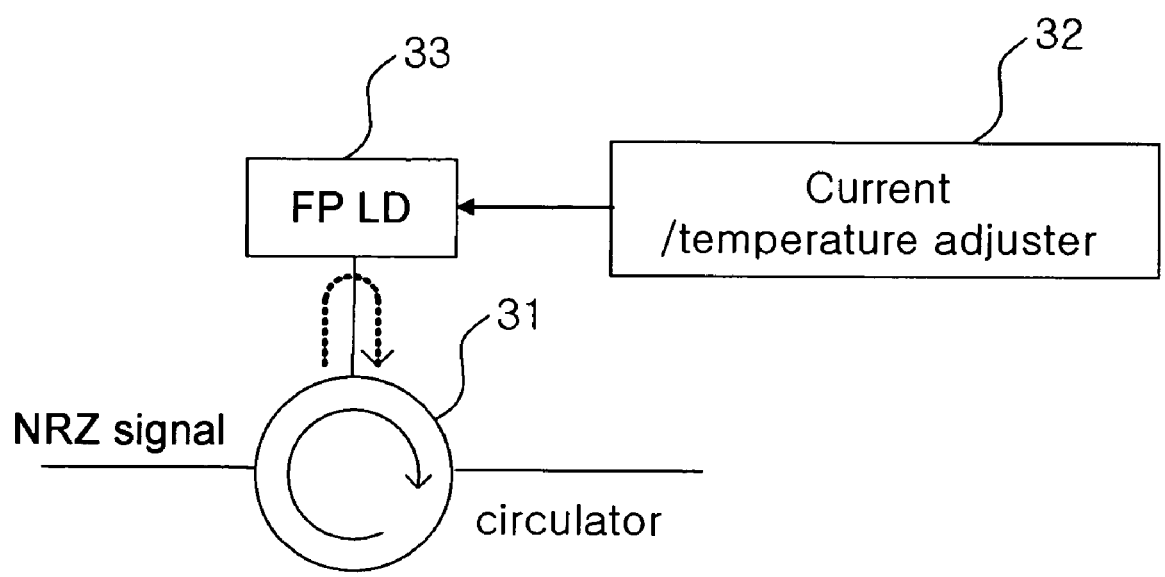
FIG. 3 is a diagram illustrating a structure of a clock extracting apparatus using an FP LD in accordance with an embodiment of the present invention.

FIG. 3 is a diagram illustrating a structure of a clock extracting apparatus using an FP LD in accordance with an embodiment of the present invention.

Theoretically, a clock component does not exist in an NRZ signal, while clock components exist in an optically modulated NRZ signal. In accordance with the present invention, one of these clock components is used to obtain the clock signal of the NRZ signal.

In order to obtain the clock signal from the NRZ signal, the present invention uses a method of beating two frequency components. Also, a magnitude of the clock component is made to be greater than other adjacent frequency components by amplifying the clock frequency component in an FP LD and thus two frequency components to be beat are made to have an equal magnitude. These processes are realized in the FP LD.

Figure 1:
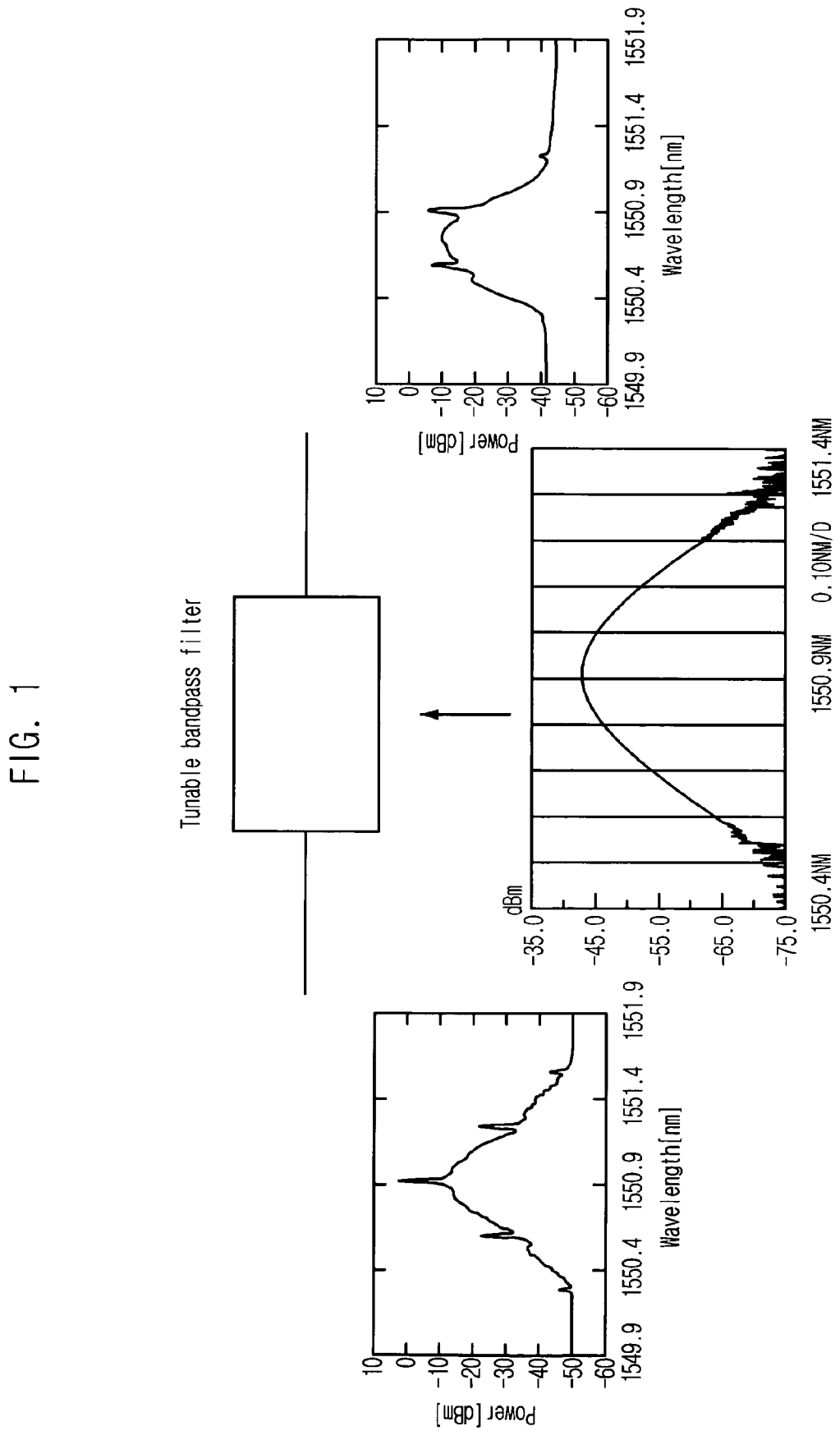
FIG. 1 is a diagram of a conventional optical clock extracting apparatus using a band pass filter.
Figure 2B:
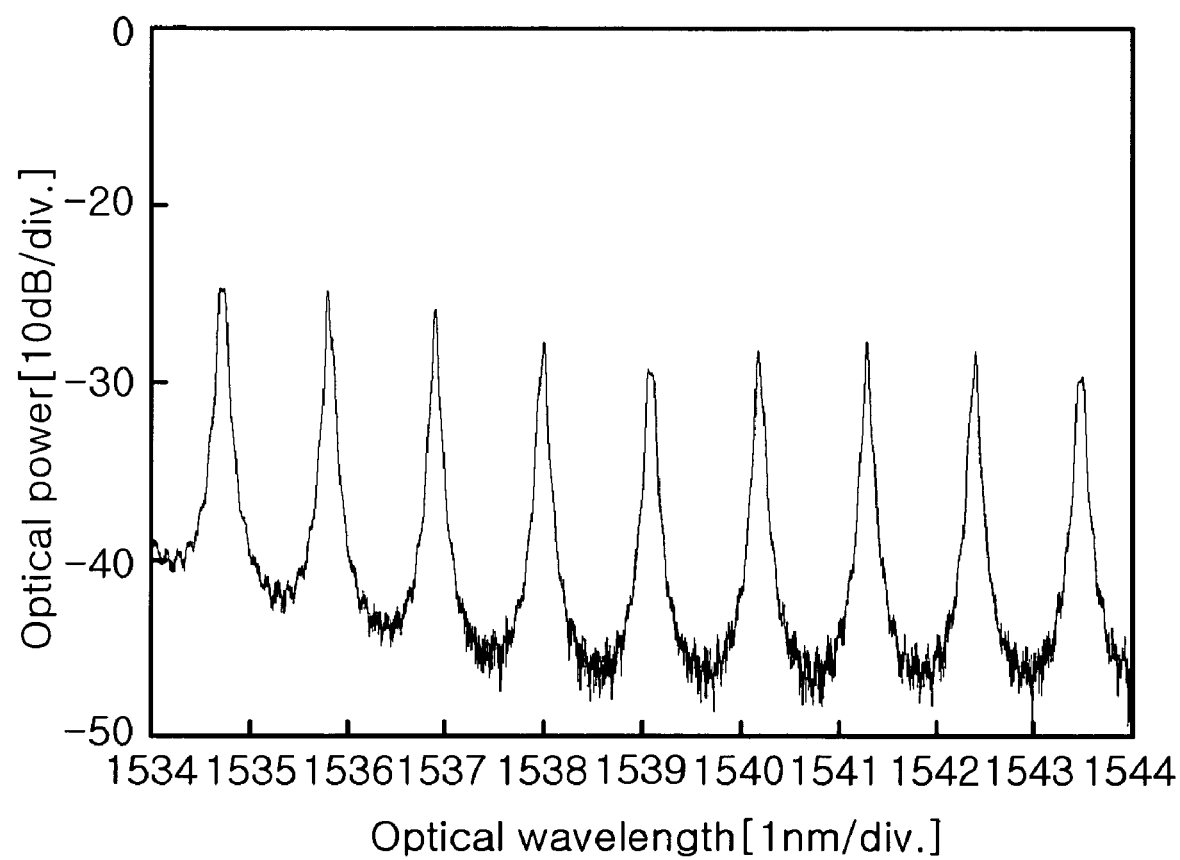
Figure 2C:
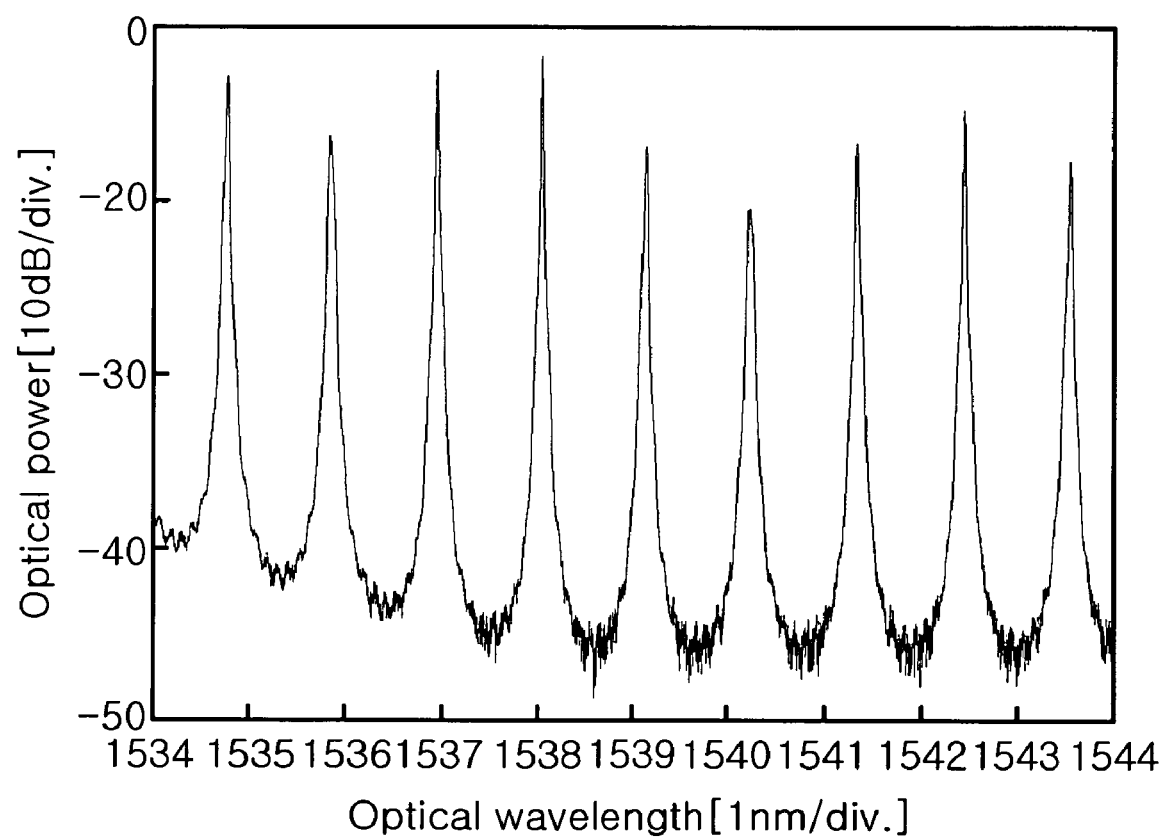

Optical spectra obtained from the FP LD are shown in FIGS. 2A to 2C. Different optical powers in the optical spectra result from the difference in an amount of a current applied to the FP LD. Therefore, the two frequency components are made to have an equal magnitude to each other by adjusting an amount of a current applied to the FP LD.

In accordance with another embodiment of the present invention, the wavelength characteristic of the optical spectrum in the FP LD is changed by adjusting the temperature of the FP LD, instead of an amount of the current. This is used to make two frequency components of an inputted signal have an equal magnitude. That is, the spectrum characteristic can be changed by adjusting the temperature of the FP LD.

Such a structure will be described below in more detail. The clock extracting apparatus using the FP LD in accordance with the present invention includes a circulator 31, a current and a temperature adjuster 32, and an FP LD 33. The circulator changes a direction of an inputted optical signal. The current and temperature adjusters 32 adjust an amount of an applied current and temperature of FP LD. The FP LD 33 selects two frequency components having different magnitudes on the spectrum of the inputted optical signal and makes the two frequency components have an equal magnitude by applying an adequate amount of current. Then, the FP LD 33 extracts a clock signal by beating two frequency components having the equal magnitude.

The clock extracting apparatus in accordance with the present invention has a tunable bandwidth filter function using the FP LD 33.

The clock signal of the NRZ signal is obtained by beating the clock component and the central frequency component existing in the optical spectrum. In order to maximize the magnitude of the clock component, two frequency components to be beat need to have an equal magnitude. In accordance with the present invention, the two frequency components are made to have an equal magnitude by adjusting an amount of current applied to the FP LD. As illustrated in FIGS. 2A to 2C, as the amount of the applied current increases, the difference between the maximum value and the minimum value in the optical spectrum increases. Using this characteristic, two frequency components are made to have an equal magnitude.

A general NRZ signal exhibits a spectrum shown in FIG. 2A. The clock component extraction can be achieved by extracting two adjacent peaks among three peaks. At this point, the selected components have different magnitudes.

This NRZ signal is incident onto the FP LD, and two frequency components having different magnitudes on the spectrum are selected, and the two frequency components are made to have an equal magnitude by applying an adequate amount of current to the FP LD. Then, the FP LD 33 extracts the clock signal by beating two frequency components having the equal magnitude.

Likewise, the wavelength characteristic of the optical spectrum in the FP LD is changed by adjusting the temperature. This is used to make two frequency components of an inputted signal to have the equal magnitude, thereby changing the spectrum characteristic.

As described above, the maximum value and the minimum value on the spectrum are changed by adjusting the temperature or current applied to the FP LD. In this manner, it is possible to increase the allowable range of the difference in magnitudes of two frequency components in the system for recovering the clock through the beating.

The present application contains subject matter related to the Korean patent application No. KR 2005-48904, filed in the Korean Patent Office on Jun. 8, 2005 the entire contents of which being incorporated herein by reference.

While the present invention has been described with respect to the particular embodiments, it will be apparent to those skilled in the art that various changes and modifications may be made without departing from the scope of the invention as defined in the following claims.

What is claimed is:

1. A clock extracting apparatus comprising:
   a circulator for changing a direction of an inputted optical signal;
   an adjuster for adjusting magnitudes of two adjacent frequency components of a spectrum with different magnitudes such that the two adjacent frequency components have equal magnitudes and the magnitudes of the two adjacent frequency components are larger than other adjacent frequency components;
   a clock extractor for receiving an adjusted signal corresponding to the two adjacent frequency components with equal magnitudes, and extracting, using a Fabry-Perot laser diode (FP LD), a clock signal by beating the two frequency components having the equal magnitudes; and
   wherein the two adjacent frequency components have equal magnitudes by adjusting a temperature or an amount of current applied to the FP LD in the adjuster.

2. The clock extracting apparatus as recited in claim 1, wherein the clock extractor makes the two frequency components to be beat have the equal magnitude by amplifying the clock component.

3. The clock extracting apparatus as recited in claim 1, wherein the adjuster controls a characteristic and wavelength of the spectrum by adjusting the applied amount of current; and
   wherein the two adjacent frequency components have equal magnitudes by controlling the characteristic and wavelength of the spectrum in the FP LD.

4. The clock extracting apparatus as recited in claim 1, wherein the adjuster controls a characteristic and wavelength of the spectrum by adjusting the temperature; and
   wherein the two adjacent frequency components have equal magnitudes by controlling the characteristic and wavelength of the spectrum in the FP LD.

5. The clock extracting apparatus as recited in claim 1, wherein the clock extractor has a tunable bandwidth filter function using the FP LD.

* * * * *